UNITED STATES PATENT OFFICE 2,675,411

BIS(4 - β - HYDROXYALKOXYPHENYL) KETONES AND PROCESS OF PREPARATION

John R. Caldwell, Kingsport, Tenn., assignor to Eastman Kodak Company, Rochester, N. Y., a corporation of New Jersey No Drawing. Original application April 11, 1951, Serial No. 220,535. Divided and this application November 26, 1952, Serial No. 322,800

6 Claims. (Cl. 260—591)

This invention relates to the preparation of bis (4-β-hydroxyalkoxyphenyl) ketones, to the preparation of polyesters formed by reacting these ketones with polybasic acids (especially the bibasic acids) and to the processes involved in the preparation thereof.

It is known that alkylene oxides react with bis (4-hydroxyphenyl) compounds of the formula

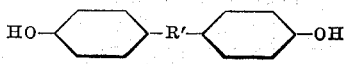

wherein R' represents an alkylidene or cycloalkylidene radical (U. S. Patent 2,331,265 issued October 5, 1943) to form bis (4-β-hydroxyalkoxyphenyl) compounds. This patent also discloses the esterification of these hydroxyalkoxy compounds with monobasic carboxylic acids; however, the products obtained are principally useful only as plasticizing agents for other resins because of their generally low melting or softening points. Thus, in Example 1 of the above patent, 2,2-di(4 - β - hydroxyethoxyphenyl) propane, is disclosed and is said to melt at approximately 112° C. In contrast, the products of my invention (wherein there is a ketone group in place of the alkylidene or cycloalkylidene group) possess greatly increased melting points, e. g., the substitution of the —CO— group for the 2,2-propylidene group in the above mentioned compound described in Example 1 of the patent referred to, results in a product which melts at 173° C. which is an increase of 61° C. This is a very high melting point for a compound containing two ether linkages and is not believed to have been predictable from the characteristics of analogous known compounds.

Other prior art patents disclosing products and processes of interest include U. S. 2,324,483, dated July 20, 1943, and U. S. 2,444,333, dated June 29, 1948. According to these patents chlorohydrins are employed instead of ethylene oxide and the products obtained do not have a keto group separating the phenylene groups.

According to my invention, I have found that bis (4-β - hydroxyalkoxyphenyl) ketones having the general formula:

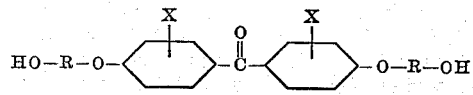

wherein R represents an alkylene radical and X represents one or more substituents selected from hydrogen atoms and/or lower alkyl radicals located in either the ortho or meta positions, can be prepared by reacting, in the presence of a catalyst, a bis (4-hydroxyphenyl) ketone having the general formula:

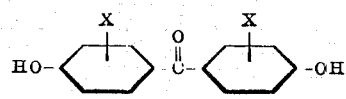

(X having been defined above), with an alkylene oxide wherein the epoxy linkage connects adjacent carbon atoms. Furthermore, I have also found that these bis (4-β-hydroxyalkoxyphenyl) ketones form polyesters upon being reacted with polybasic carboxylic acids.

By "alkylene radical," as employed herein, I mean a divalent radical where R in the above formula has the formula:

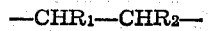

wherein each of $R_1$ and $R_2$ represents a hydrogen atom or a low molecular weight alkyl radical such as a methyl or an ethyl radical. Thus, I specifically intend to include the radicals —$CH_2$—$CH_2$—; —$CH(CH_3)$—$CH_2$;
—$CH_2$—$CH(CH_3)$—; —$CH(CH_3)$—$CH(CH_3)$—;
—$CH(C_2H_5)$—$CH_2$; and —$CH_2$—$CH(C_2H_5)$— which comes within the scope of my expression "alkylene radical containing from 2 to 4 carbon atoms" as employed hereinafter.

It is an object of my invention to provide new and useful compounds, viz. bis (4-β-hydroxyalkoxyphenyl) ketones, and a process for their preparation. It is also an object of my invention to provide a new series of valuable polyesters of my new bis (4-β-hydroxyalkoxyphenyl) ketones, especially bis (4-β-hydroxyethoxyphenyl) ketone, with polybasic (particularly dibasic) acids and a process for their manufacture. Other objects will become apparent hereinafter.

The polyesters produced in accordance with my invention are valuable in the manufacture of fibers, threads, sheets, films, coating compositions, molding compositions, etc. These polyesters are characterized by their hardness and high melting point. One of the most important uses of these polyesters is in the field of protective coatings. These polyesters impart a high degree of surface hardness and moisture resistance when incorporated in various types of air drying and baking enamels, varnishes and lacquers.

In accordance with my invention I can react, in the presence of a catalyst, one or more bis (4-hydroxyphenyl) ketones having the formula:

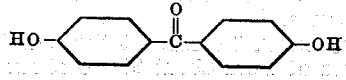

with one or more alkylene oxides containing from 2 to 4 carbon atoms wherein the epoxy linkage is across adjacent carbon atoms, to produce a bis (4-β-hydroxyalkoxyphenyl) ketones having the general formula:

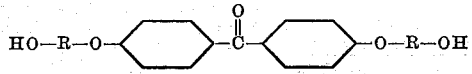

wherein R represents an alkylene radical containing from 2 to 4 carbon atoms.

The bis (4-hydroxyphenyl) ketone which is employed can be readily prepared by known methods from phenol and phosgene. Alternatively, as indicated in the first general formula of this specification, I can also employ nuclearly substituted bis (4-hydroxyphenyl) ketones in accordance with my invention. Such ketones can be prepared by reacting nuclearly substituted phenols with phosgene. Thus bis (4-hydroxy-3-methylphenyl) ketone can be prepared by heating o-cresol with phosgene. Likewise, bis (4-hydroxy-2-methylphenyl) ketone can be similarly prepared by employing m-cresol. Similarly, other analogous compounds can be prepared by reacting other nuclearly substituted phenols, e. g., m-ethylphenol, o-ethylphenol, etc. with phosgene to produce bis (4-hydroxy-3-ethylphenyl) ketone, bis (4-hydroxy-2-ethylphenyl) ketone, etc.

The alkylene oxides which I can advantageously employ include ethylene oxide, 1,2-propylene oxide, 1,2-butylene oxide and 2,3-butylene oxide. Most advantageously, I employ ethylene oxide. From 2 to 3 mols of the alkylene oxide are advantageously employed per mol of the bis (4-hydroxyphenyl) ketone. Larger and smaller ratios can also be employed; however, most advantageously, a range of from 2.2 to 2.4 mols of the alkylene oxide per mol of the ketone is employed.

It is advantageous to conduct the reaction in the presence of a catalyst. Advantageously, alkaline type catalysts such as the alkali metal hydroxides, alkoxides or alcoholates, and the quaternary ammonium hydroxides can be employed. Examples of such catalysts include sodium hydroxide, potassium propoxide, sodium ethoxide, potassium methoxide, potassium hydroxide, tetramethyl ammonium hydroxide, trimethylbenzyl ammonium hydroxide, etc. The proportion of catalyst advantageously employed varies from about 0.1% to about 2% by weight of the bis (4-hydroxyphenyl) ketone being reacted. However, higher or lower percentages can also be employed. It is also possible to employ other alkaline catalysts than those specifically mentioned above, e. g., the alkaline earth alkoxides, alcoholates, etc.

In carrying out the reaction it is advantageous to employ an unreactive solvent (viz. an inert solvent) which does not enter into the reaction itself. Solvents such as the lower aliphatic alcohols are most advantageously employed, e. g., methyl alcohol, ethyl alcohol, isopropyl alcohol, etc. However, other well known solvents may also be employed with advantage, e. g., dioxane, methoxyethyl alcohol, tetrahydrofuran, etc.

The reactants, catalyst and solvent can be placed in the reaction vessel in any desired sequence or simultaneously. Advantageously, the ethylene oxide can be introduced into a vessel containing the other materials, during the course of the reaction. The reaction can be advantageously conducted in a closed vessel under autogenous pressures.

Advantageously, I carry out the reaction at a temperature of from about 80° to about 140° C. Most advantageously I employ temperatures in the range of from 90° to 110° C.

Upon completion of the reaction the product can be readily purified by stirring with an aqueous dilute alkaline solutinon of KOH, NaOH, etc. to remove the unreacted bis (4-hydroxyphenyl) ketone by dissolution thereof. The product can then be separated by filtration and recrystallized from a suitable solvent such as methyl alcohol, a mixture of benzene and ethyl alcohol, etc. Other methods of purification can also be used as may be expedient under any given set of circumstances, e. g. by distillation, etc. The bis (4-β-hydroxyalkoxyphenyl) ketones are soluble in many solvents such as dioxane, isopropyl alcohol, ethyl alcohol, acetone, methyl alcohol, etc., which can be heated to facilitate the dissolution therein.

The bis (4-β-hydroxyalkoxyphenyl) ketones can be employed in the manufacture of the linear polyesters (referred to previously) by esterifying these ketones with polybasic (especially dibasic) carboxylic acids. Since the bis (4-β-hydroxyalkoxyphenyl) ketones possess unusually high melting points for their particular type of compounds (viz. diether compounds), the polyesters derived therefrom tend also to have high melting or softening points. In order to obtain polyesters possessing the highest melting or softening points, bis (4-β-hydroxyethoxyphenyl) ketone is advantageously employed. The employment of the propylene and butylene derivatives, instead of the ethylene derivative, results in lower melting or softening points in the polyesters obtained and they are accordingly not as satisfactory for most purposes.

Advantageously, I employ dicarboxylic acids containing from 4 to 10 carbon atoms selected from among the saturated and unsaturated aliphatic acids and the monocyclic aromatic acids. It is sometimes advantageous to employ the acids as their anhydrides or lower alkyl esters; hence, when I refer to an acid or to acids, it is to be understood that the anhydrides or esters can also be employed. Examples of dicarboxylic acids which can be advantageously employed include succinic acid, glutaric acid, adipic acid, pimelic acid, sebacic acid, o-phthalic acid, maleic acid, fumaric acid, itaconic acid, etc. The anhydrides and esters of these acids can also be employed in most instances with efficacy. The wide variety of saturated and unsaturated aliphatic and aromatic dibasic acids, anhydrides and esters which can be employed in reactions with dihydric alcohols to form linear polyesters is well set forth in the prior art and most of them can be utilized in accordance with my invention. Mixed polyesters containing the dihydric bis (4-β-hydroxyalkoxyphenyl) ketones in combination with other dihydric and polyhydric alcohols such as the glycols, glycerine, etc. can also be prepared. In addition, oil-modified alkyd resins can be prepared by esterifying mixtures of the bis (4-β-hydroxyalkoxyphenyl) ketones and glycerols with phthalic acid, linseed fatty acids, various other natural or derived acids, etc. according to known procedures. The method of esterification depends upon the nature of the particular acids and/or additive glycols, glycerols, etc. being employed.

In preparing such esters it is usually advantageous to employ a condensation agent or catalyst such as sodium hydroxide, calcium oxide, zinc chloride, sulfuric acid, toluene sulfonic acid, etc. Other equally efficacious condensing agents or catalysts have been described in the prior art and can also be employed. It is also advantageous to employ an inert atmosphere, e. g. ni- The following examples will serve to illustrate further the manner of practicing my invention.

EXAMPLE 1

*Bis (4-β-hydroxyethoxyphenyl) ketone*

42 grams of bis (4-hydroxyphenyl) ketone, 20 grams of ethylene oxide, 150 cc. of methyl alcohol, and 0.5 gram of sodium methoxide were placed in an autoclave. This mixture was stirred at a temperature of from 90° to 100° C. for six hours. The methyl alcohol was then evaporated on a steam bath and the crystalline residue was stirred at 70° to 80° C. with 200 cc. of water and 10 grams of sodium hydroxide. This mixture was cooled and filtered. The crystals which remained were washed with cold water. The yield obtained was about 55 to 56 grams of bis (4-β-hydroxyethoxyphenyl) ketone which has a melting point of 170°–173° C. Upon recrystallization of this material from methyl alcohol, a melting point of 174° C. was obtained and the product had an analysis of 11.0 percent hydroxyl content as compared to the theoretical percentage of 11.2 percent.

EXAMPLE 2

*Bis (4-β-hydroxyethoxyphenyl) ketone*

42 grams of bis (4-hydroxyphenyl) ketone, 150 cc. of ethyl alcohol, and 0.6 gram of potassium hydroxide were placed in an autoclave. The mixture was then stirred at 110° C. while 20 grams of ethylene oxide were pumped into the mixture during a period of two hours. The product obtained was isolated in the same manner as described in Example 1 above, giving a yield of from about 85 to 90 percent of bis (4-β-hydroxyethoxyphenyl) ketone.

EXAMPLE 3

*Polyester of Example 1 ketone with adipic acid*

302 grams (1.0 mol) of bis (4-β-hydroxyethoxyphenyl) ketone (prepared in accordance with Example 1) was mixed with 146 grams (1.0 mol) adipic acid and 0.5 gram of zinc chloride was added. This mixture was melted and a stream of nitrogen bubbled through the liquid in order to provide agitation and to exclude oxygen. The temperature was maintained at 150–160° C. for three hours. The temperature was then raised to 180–200° C. for four hours, following which the product was heated at a reduced pressure of about one to two mm. of Hg pressure at 180–200° C. for three additional hours. The product obtained was a pale yellow translucent solid. It had a melting point of from about 90° to 100° C. It is soluble in hot dioxane, hot cresol, and dimethyl acetamide. This polyester can be pulled into fibers at the melting point. It is useful as an ingredient of varnishes, lacquers, and other protective coatings where it imparts hardness and resistance to moisture. In order to produce such protective coatings, other resins such as phenolic resins, urea resins, and alkyd resins, can be combined with the polyester prepared in accordance with this example.

EXAMPLE 4

*Polyester employing ethyl sebacate*

302 grams (1.0 mol) of bis (4-β-hydroxyethoxyphenyl) ketone, 258 grams (1.0 mol) of ethyl sebacate and 0.4 gram of $Mg(OCH_3)_2$ in 5 cc. of methanol were mixed together. This mixture was stirred under an atmosphere of dry nitrogen gas and heated at 170–180° C. for five hours. The temperature was then raised to 200–210° C. for two additional hours, after which the mixture was heated under a reduced pressure of about one to two mm. of Hg pressure at approximately the same temperature for an additional four hours. The polyester obtained was a hard, tough solid which had a melting point of about 80° to 90° C. This polyester is soluble in hot dioxane, hot acetic acid, and cresol. It can be extruded or pressed into sheets, tubes, plates, rods, etc. It is also useful as an ingredient in varnishes and other protective coatings. It is especially valuable for use as a solvent resistant gasket and packing material.

EXAMPLE 5

*Polyester employing ethyl m-phthalate*

302 grams (1.0 mol) of bis (4-β-hydroxyethoxyphenyl) ketone, 222 grams (1.0 mol) of ethyl m-phthalate (ethyl isophthalate) were mixed together and 0.4 gram of sodium ethoxide dissolved in 10 cc. ethanol were admixed therewith. This mixture was then heated in exactly the same manner as described in Example 4 above. The polyester obtained has a melting point at 130 to 140° C. and had a refractive index of 1.72 which is remarkably high for an organic material; this refractive index corresponds to that of optical glass. The polyester obtained is especially valuable for the manufacture by injection molding of optical equipment, such as lenses, prisms, etc.

EXAMPLE 6

*Polyester employing ethyl m-phthalate and ethyl terephthalate*

302 grams (1.0 mol) of bis (4-β-hydroxyethoxyphenyl) ketone, 111 grams (0.5 mol) of ethyl m-phthalate (ethyl isophthalate) and 111 grams (0.5 mol) of ethyl terephthalate were mixed with 0.3 gram of potassium ethoxide. This mixture was then treated in accordance with the process set forth in Example 4. The polyester obtained had a melting point of 180 to 190° C. It can be spun into fibers than can be cold drawn. It has a refractive index of 1.74. The polyester is especially valuable for the manufacture of lenses and prisms by injection molding methods.

Mixed polyesters containing bis (4-β-hydroxyethoxyphenyl) ketone and other polyhydroxy compounds such as the diols, triols, etc., can be prepared in a manner similar to that set forth above. For example, a mixture of 2 parts of bis (4-β-hydroxyethoxyphenyl) ketone prepared as described in Example 2 and 1 part of ethylene glycol can be esterfied with o-phthalic acid to give a resin that results in improved surface hardness when incorporated in baking enamels.

When surface coating resins are desired, it is advantageous to employ a relatively low molecular weight polyester. To obtain such a polyester, the bis (4-β-hydroxyethoxyphenyl) ketone (prepared as in either Example 1 or 2) can be heated together with a suitable polybasic acid, ester or anhydride at a temperature of from about 150° to 200° C. for from about 3 to 6 hours until a product is obtained having a desirable acid number of, for example, from about 10 to 20.

Catalysts such as described above can be advantageously employed.

When it is desired to produce polyesters useful in the manufacture of fibers and molding plastics, it is advantageous to employ polyesters having higher molecular weights. In such cases, the resins require relatively long periods of heating at elevated temperatures such as 200° C. or higher, and must thereafter be heated under greatly reduced pressure in order to complete the polyesterification reaction. To obtain such a resin, for example, a temperature of 150° to 200° C. can be employed during the first stage of the reaction for from about 3 to 5 hours at atmospheric pressure. The resulting intermediate product can then be heated at 200° C. or higher at a greatly reduced pressure, e. g. 0.1 mm. to 5 mm. of Hg pressure, for from about 2 to 4 hours to complete the reaction. Of course, other low pressures can also be employed.

It is thus apparent that a wide variety of resins having a broad range of useful properties can be prepared by procedures similar to those set forth in the working examples above. The choice of reactants and the conditions under which the reaction takes place can be varied to suit the purpose desired.

This application is a divisional application based upon by parent application, Serial No. 220,535 filed on April 11, 1951.

What I claim is my invention and desire to secure by Letters Patent of the United States is:

1. bis (4-β-hydroxyethoxyphenyl) ketones having the formula:

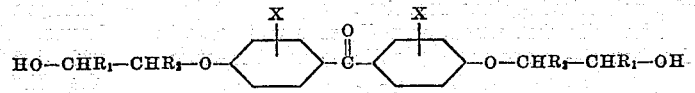

wherein $R_1$ and $R_2$ contain, when added together, no more than two carbon atoms and X, $R_1$ and $R_2$ each represents a member of the group consisting of a hydrogen atom, a methyl radical and an ethyl radical, X being located in a position selected from the ortho and meta positions on the benzene nuclei.

2. Bis (4-β-hydroxyethoxyphenyl) ketone.

3. A compound as defined in claim 1 wherein $R_1$ represents a methyl radical and $R_2$ represents a hydrogen atom.

4. A compound as defined in claim 1 wherein $R_1$ represents a hydrogen atom and $R_2$ represents a methyl radical.

5. A compound as defined in claim 1 wherein $R_1$ and $R_2$ each represents a methyl radical.

6. A compound as defined in claim 1 wherein $R_1$ represents an ethyl radical and $R_2$ represents a hydrogen atom.

References Cited in the file of this patent
UNITED STATES PATENTS

| Number | Name | Date |
|---|---|---|
| 2,331,265 | Coleman | Oct. 5, 1943 |
| 2,592,560 | Greenlee | Apr. 15, 1952 |